(12) United States Patent
Sozzi

(10) Patent No.: US 10,697,835 B2
(45) Date of Patent: Jun. 30, 2020

(54) METHOD AND DEVICE FOR ASSEMBLING A TEMPERATURE SENSOR

(71) Applicant: Aktiebolaget SKF, Gothenburg (SE)

(72) Inventor: Fabrizio Sozzi, Sant' Antonino di Susa (IT)

(73) Assignee: AKTIEBOLAGET SKF, Gothenburg (SE)

(*) Notice: Subject to any disclaimer, the term of this patent is extended or adjusted under 35 U.S.C. 154(b) by 0 days.

(21) Appl. No.: 15/408,854

(22) Filed: Jan. 18, 2017

(65) Prior Publication Data

US 2017/0211989 A1    Jul. 27, 2017

(30) Foreign Application Priority Data

Jan. 21, 2016   (IT) ................. 102016000005727

(51) Int. Cl.

| | | |
|---|---|---|
| G01K 1/14 | (2006.01) | |
| G01K 1/16 | (2006.01) | |
| G01K 13/00 | (2006.01) | |
| G01K 13/08 | (2006.01) | |
| F16C 41/00 | (2006.01) | |
| G01M 13/04 | (2019.01) | |
| G01M 17/10 | (2006.01) | |

(52) U.S. Cl.
CPC ............. G01K 1/14 (2013.01); F16C 41/00 (2013.01); G01K 13/08 (2013.01); G01M 13/04 (2013.01); G01M 17/10 (2013.01); F16C 2233/00 (2013.01); F16C 2326/10 (2013.01)

(58) Field of Classification Search
CPC .. G01K 1/14; G01K 1/08; G01K 1/16; G01K 13/00; G01D 11/245; G01N 27/283; G01N 27/07; G01N 29/233; G01N 29/225

USPC ................. 374/163, 179, 208, 141; 73/866.5
See application file for complete search history.

(56) References Cited

U.S. PATENT DOCUMENTS

| | | | | |
|---|---|---|---|---|
| 4,355,912 A | * | 10/1982 | Haak | G01K 1/14 374/208 |
| 4,826,540 A | | 5/1989 | Mele | |
| 5,348,396 A | * | 9/1994 | O'Rourke | G01K 11/3206 374/130 |
| 6,220,749 B1 | * | 4/2001 | Wyker | F16C 19/525 374/141 |
| 6,352,361 B1 | * | 3/2002 | Nimberger | G01K 1/08 374/142 |

(Continued)

FOREIGN PATENT DOCUMENTS

CA    2213032 A1    2/1998

*Primary Examiner* — Gail Kaplan Verbitsky
(74) *Attorney, Agent, or Firm* — Garcia-Zamor Intellectual Property Law, LLC; Ruy Garcia-Zamor; Bryan Peckjian

(57) ABSTRACT

A method for assembling sensor on a housing. The sensor provided with a body, a protrusion and an electrical connection cable. The housing being provided with a blind hole shaped to engage with the protrusion of the sensor. The assembly method provides the following phases: a) inserting the protrusion in the blind hole of the housing bringing an end wall of the protrusion into contact with a bottom wall of the blind hole, b) tightening a bushing to a first tightening torque value, the bushing having an external thread that engages with an internal thread of the blind hole and an internal thread that engages with an external thread of the protrusion, in which all of the threads have the same pitch, c) tightening a hexagonal nut to a second tightening torque value.

17 Claims, 2 Drawing Sheets

(56) References Cited

U.S. PATENT DOCUMENTS

| | | | | |
|---|---|---|---|---|
| 6,543,304 B1* | 4/2003 | Smith | G01D 11/245 | 73/866.5 |
| 6,599,012 B2* | 7/2003 | Gul | G01K 1/08 | 374/148 |
| 6,607,302 B2* | 8/2003 | Lyle | G01K 1/16 | 374/144 |
| 7,090,394 B2* | 8/2006 | Hashikura | G01K 1/08 | 374/141 |
| 7,201,513 B2* | 4/2007 | Nakabayashi | G01K 13/02 | 374/163 |
| 7,465,086 B1* | 12/2008 | Foreman, Jr. | G01K 1/08 | 136/200 |
| 8,123,406 B2* | 2/2012 | Erickson | F01D 9/04 | 374/179 |
| 8,142,072 B2* | 3/2012 | Kinami | C08K 5/0041 | 116/216 |
| 8,672,541 B2* | 3/2014 | Ito | G01K 1/08 | 374/141 |
| 8,770,837 B2* | 7/2014 | Egan | G01K 1/08 | 374/179 |
| 9,354,121 B2* | 5/2016 | Lukach, Jr. | G01K 1/08 | |
| 2002/0085617 A1* | 7/2002 | Gul | G01K 1/08 | 374/208 |
| 2006/0013282 A1* | 1/2006 | Hanzawa | G01K 1/08 | 374/163 |
| 2006/0215731 A1* | 9/2006 | Gadonniex | G01K 1/16 | 374/208 |
| 2011/0158287 A1* | 6/2011 | Clark | G01D 11/245 | 374/185 |
| 2014/0036960 A1* | 2/2014 | Middleton | B23K 20/129 | 374/208 |
| 2014/0334523 A1* | 11/2014 | Lin | G01K 1/08 | 374/179 |
| 2018/0038741 A1* | 2/2018 | Krishnamurthy | G01K 7/22 | |
| 2019/0101453 A1* | 4/2019 | Foreman, Jr. | G01K 1/08 | |

* cited by examiner

METHOD AND DEVICE FOR ASSEMBLING A TEMPERATURE SENSOR

CROSS REFERENCE TO RELATED APPLICATIONS

This application claims priority to Italian patent application no. 102016000005727 filed on Jan. 21, 2016, the contents of which are fully incorporated herein by reference.

FIELD OF THE INVENTION

The present invention relates to a method and a device for installing sensor means, in particular a temperature sensor.

BACKGROUND OF THE INVENTION

The present invention describes a specific application of the temperature sensor, without thereby being limited to same. The application relates to the rail transport sector and in particular to the reading and related monitoring of the temperature in the vicinity of a roller bearing of an axle of a railway vehicle.

Although particularly suited to railway use, the present invention is nonetheless applicable to any other related technical sector, such as (but without limitation) the industrial sector or the off-highway sector. In all of the applications mentioned, the invention can be used both if the inner ring of the bearing is rotatable while the outer ring of the bearing is fixed, or vice versa. Furthermore, the invention can be used regardless of the rolling members used (spheres, rollers, conical rollers, etc.).

In the railway vehicle sector, roller bearings for the axles of railway vehicles are subject to high stresses. In particular, the bearings used on railway axles are usually found in pairs and are interposed between the suspension and the flanged wheel of the vehicle. The bearing is seated in a housing, or "axle box", and the stress transmitted by the suspension creates a significant temperature increase during operation. This temperature must be monitored at all times, since an over-temperature reading indicates a malfunction of the system. Specifically, three alarm thresholds are used:

A first alarm threshold is reached when a predetermined absolute temperature value is exceeded, A second alarm threshold is reached when the difference between the temperature of the bearing and the temperature of the external environment exceeds another predetermined value, Finally, a third alarm threshold is reached when a predetermined temperature difference between the two bearings of a single railway axle is exceeded.

This requirement reveals a clear need to constantly monitor the temperature of the bearing to determine the temperature at a point close to the most stressed zone of the bearing.

The temperature is monitored using a temperature sensor for each bearing that is connected electrically to a control unit that uses the temperature values read by the censors to manage activation of the alarms related to the aforementioned temperature thresholds being exceeded.

The temperature sensor is provided with a temperature-sensitive element that is inserted in the housing containing the bearing and reads the temperature of the housing close to the point of the bearing subject to the greatest stress.

The sensor needs to be stably attached to the housing, the electrical cable of same must not rotate during assembly, and same must be properly sealed. Failure to satisfy these conditions has an obvious adverse effect on the transmission of temperature signals.

Satisfying these requirements complicates assembly of the temperature sensor, requiring observance of very precise tolerances, and in any case a somewhat long and laborious assembly process. In particular, there are two known solutions to ensure that the temperature sensor is in stable contact with the surface from which the temperature reading is to be taken:

A first solution involves providing the sensor with a protrusion of very specific diameter and—in particular—length, and providing the housing with a hole of equally precise dimensions, such as to guarantee a good connection with the protrusion of the sensor. The sensor may be attached to the housing by means of a suitable flange and attachment screws. This means that the housing is designed to have at least three holes, one of which is very precise.

To avoid such stringent machining tolerances, a second known solution involves screwing the sensor into the hole in the housing. In this way, both components can be provided with a thread without restrictive tolerances. However, the drawback of this solution is linked to the fact that the cable of the sensor cannot be assembled on same or built into the sensor, but must be connected to the sensor only after the assembly operation, in order to prevent the cable from rotating during assembly. This requires the use of additional electrical connectors for subsequent connection of the cable to the temperature sensor.

BRIEF SUMMARY OF THE INVENTION

One objective of the present invention is to provide a method for assembling sensor means on a housing, in particular a temperature sensor on an axle box of a train axle, that simply and cheaply addresses the technical problems described above.

The assembly method according to the invention therefore provides for the use of sensor means with the electrical cable already connected that can be screwed into the housing without the need for excessively stringent machining tolerances and without rotating the electrical cable during assembly. This is achieved by executing the steps of this method according to the independent method claim attached.

According to another aspect, the invention describes a device for assembling the sensor means used to implement the method described above, the device including and internally and externally threaded bushing and having the features set out in the independent device claim attached.

Other preferred and/or particularly advantageous embodiments of the invention are described using the features set out in the attached dependent claims.

BRIEF DESCRIPTION OF THE SEVERAL VIEWS OF THE DRAWING

Some nonlimiting preferred embodiments of the invention are described below with reference to the attached drawings, in which.

DETAILED DESCRIPTION OF THE INVENTION

Figure 1:
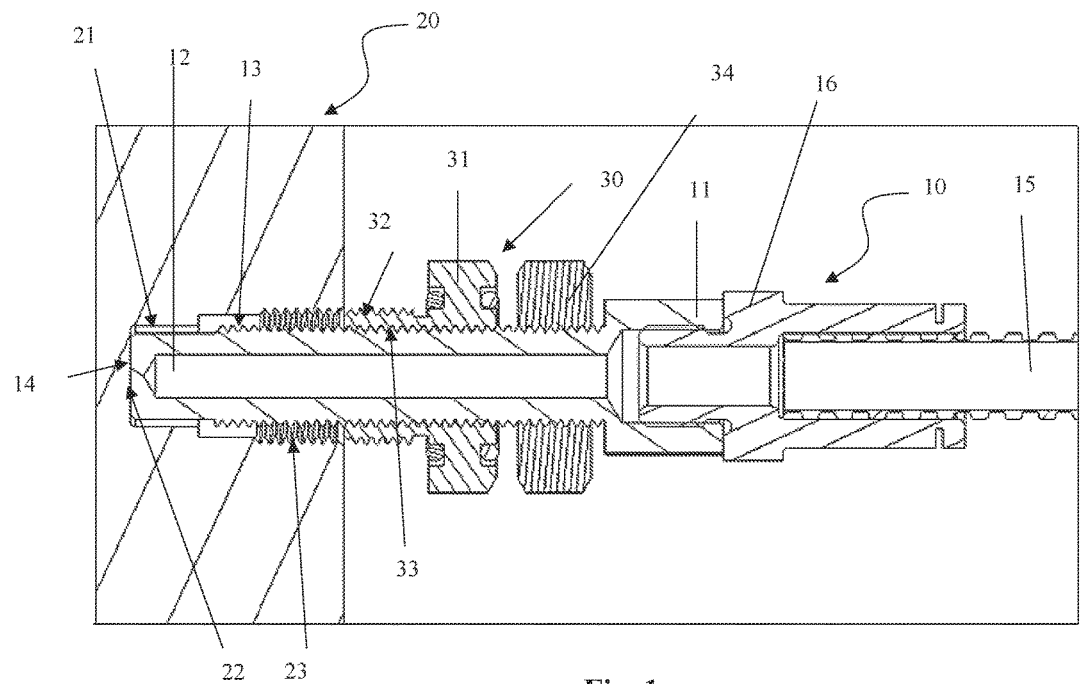
FIG. 1 is a partial axial cross section showing the temperature sensor, the housing and the assembly device for the temperature sensor in a first phase of the method for assembling the temperature sensor on the housing, according to a preferred embodiment of the invention.

The method for assembling sensor means 10 on a housing 20 is described below with reference to the figures, and in particular to FIG. 1.

Preferably, the sensor means 10 is a temperature sensor for use on the roller bearing of the axles on railway vehicles. The temperature sensor is used to monitor the temperature near to the zone of the bearing subject to the greatest stress, communicating the data read to a control unit (of a known type, which is therefore not shown in the attached figures). The control unit manages this data and activates the appropriate alarms if the temperature read is higher than certain thresholds, as described in the introduction to the present description. However, the sensor means need not be a temperature sensor and may also be used for other applications within the railway domain.

The sensor means 10 are provided with a body 11 with a protrusion 12 that contains the temperature-sensitive element. The protrusion 12 has an external thread 13 used for assembly (as described below) and an end wall 14 designed to come into contact with the surface of the housing for which the temperature is to be measured.

The sensor means 10 also have an electrical cable 15 for connection to the control unit. The electrical cable 15 is stably connected to the body 11 to obviate the need to use additional electrical connectors between the sensor and the cable, thereby guaranteeing the continuity of the electrical signal.

The housing 20, shown schematically in the figures as having a prismatic shape but that can naturally assume any shape, is preferably the aforementioned axle box, or the housing that contains the bearing of the train axle. The housing is provided with a blind hole 21 shaped to engage with the protrusion 12 of the sensor means 10. In particular, the blind hole 21 has an internal thread 23 used for assembly (as described below) and a bottom wall 22 that comes into contact with the sensing element of the sensor or the end wall 14 of same.

FIG. 1 also shows the assembly device 30 that enables implementation of the assembly method according to the present invention. The device is essentially formed by a bushing 31 and clamping means 34, such as a conventional hexagonal clamping nut. The bushing 31 is a hollow threaded bushing that is coaxial with the temperature sensor (or with the generic sensor means 10). The bushing has an external thread 32 that engages with the internal thread 23 of the blind hole 21 in the housing 20 and an internal thread 33 that engages with the external thread 13 of the protrusion 12 of the sensor means 10.

An essential feature of the device is that the external thread 32 and the internal thread 33 of the bushing 31 have the same pitch. Consequently, the external thread 13 of the protrusion of the sensor and the internal thread 23 of the blind hole 21 in the housing 20 also have the same pitch. In other words, all of the threads 13, 23, 32, 33 have the same pitch. Preferably, the shared pitch of the threads can be the conventional standard value of 1.5 mm. The bushing 31 therefore has two coaxial threads, the external thread being used to stably attach the bushing to the housing and the internal thread being used to hold the sensor means in the correct position. As demonstrated, the fact that the two threads of the bushing have the same pitch enables the protrusion 12 of the sensor means to be kept in the correct axial position when the bushing is being screwed into the housing, without rotating same and therefore without rotating the electrical cable 15 used for connecting to the control unit.

Figure 2:
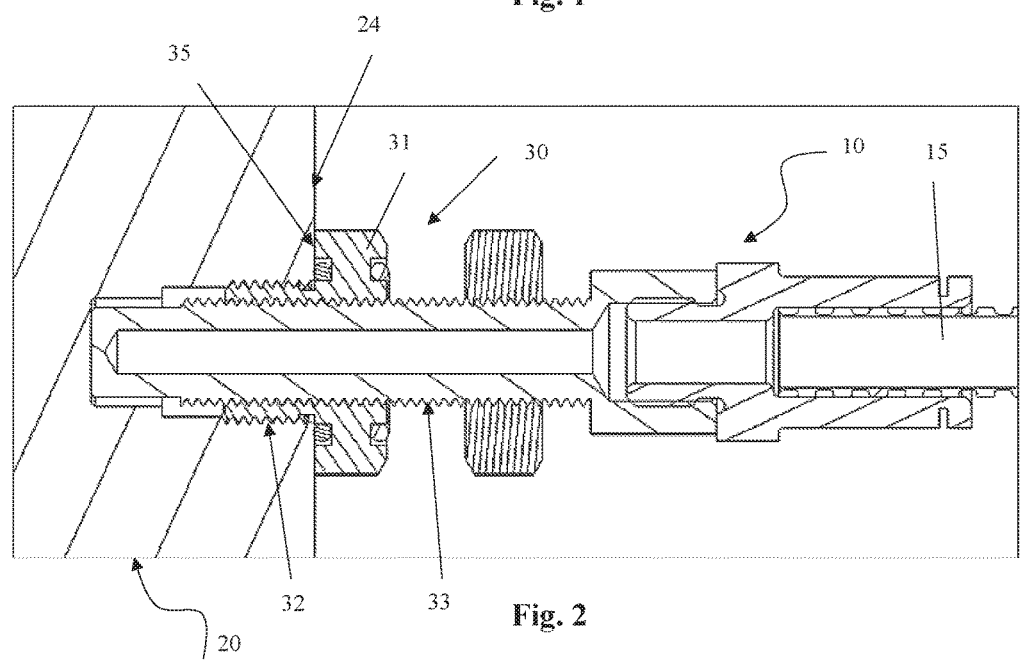
FIG. 2 is the same partial axial cross section as FIG. 1, showing a second phase of the assembly method.
Figure 3A:
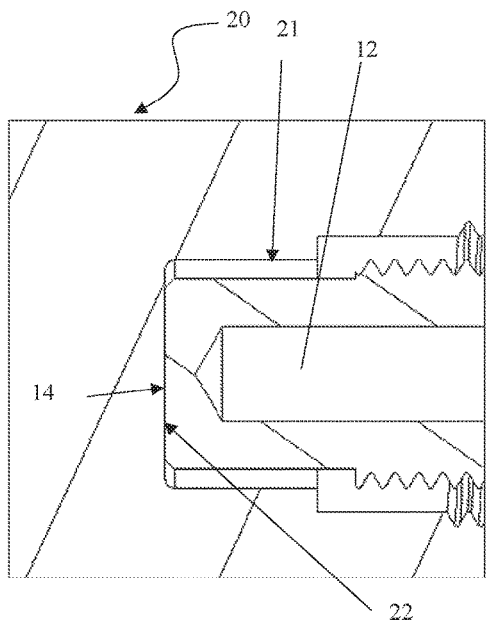
FIGS. 3a and 3b show a possible subsequent phase of the assembly method from the previous figures.
Figure 3B:
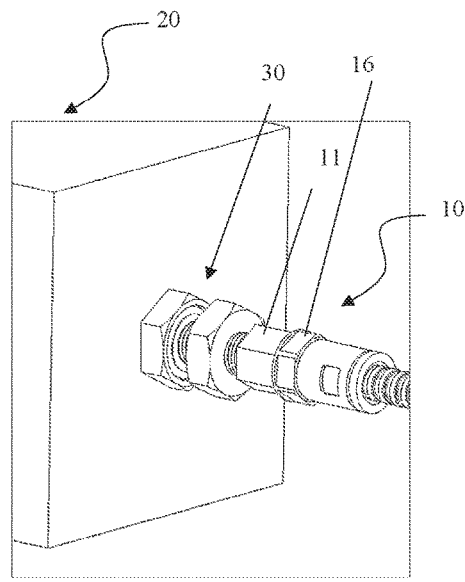
Figure 4:
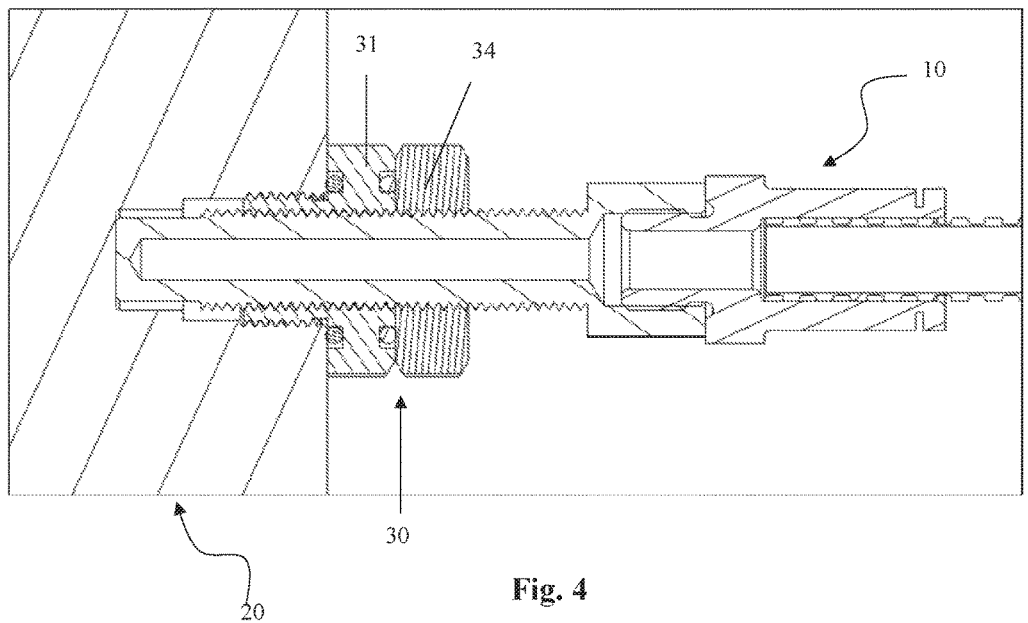
FIG. 4 shows a final phase of the same assembly method.

The method for assembling sensor means is described below with reference to FIGS. 1 to 4, and in particular:

FIG. 1 shows a first phase (a) in which the sensor means is assembled on the housing, involving insertion (which may be manual) of the protrusion 12 in the hole 21 in the housing 20, bringing the end wall 14 of the protrusion 12 into contact with the bottom wall 22 of the blind hole 21. In this phase of the method, the bushing 31 is held static, i.e. is not screwed to the internal thread 23 of the housing 20, FIG. 2 shows the next phase (b) of the method, which involves screwing the bushing 31 onto the housing 20 up to a first tightening torque value, in other words bringing an end wall 35 of the bushing 31 into contact with an end wall 24 of the housing 20. The fact that the external thread 32 and the internal thread 33 of the bushing have the same pitch ensures that the sensor means 10 are kept in the correct axial position without rotating, and therefore without rotating the electrical cable 15 used for connecting to the control unit, Preferably, on completion of this phase, the end wall 14 of the protrusion 12 is brought into contact with the bottom wall 22 of the blind hole 21 by slightly rotating the sensor means 10 using a hexagonal head 16 of the body 11, as shown in FIGS. 3a and 3b, Finally, the last phase (c) of the assembly method shown in FIG. 4 involves tightening clamping means 34, such as a hexagonal nut of the assembly device 30, to a second tightening torque value, bringing same into contact with the bushing 31.

The advantages of the assembly method described above and the related device are evident. Primarily, this method obviates the need for any machining of the components (sensor means and housing) that requires precision tolerances. Furthermore, the sensor can be assembled with the electrical cable for connection to the control unit already attached. Indeed, the use of the bushing with internal and external threads that have the same pitch makes it possible to tighten the sensor on the housing without causing any macroscopic rotation of same. Potential micro rotations of the sensor do not generate any problems with the electrical cable and can be recovered subsequently by acting on the hexagon of the body of the sensor. Finally, the assembly method is simple and rapid to execute and requires an assembly device that is equally simple to make. Lastly, the method is also beneficial in economic terms.

In addition to the embodiments described above, numerous other variants of the invention are possible. The embodiments are provided solely by way of example and do not limit the scope of the invention, the applications of same or the possible configurations of same. Indeed, although the description provided above enables the person skilled in the art to carry out the present invention at least according to one example configuration of same, numerous variations of the components described could be used without thereby moving outside the scope of the invention, as described in the attached claims interpreted literally and/or according to the legal equivalents of same.

The invention claimed is:

1. A method of assembling a sensor on a housing, comprising:
    providing the sensor with a body having a protrusion, and
       a connecting electrical cable connected to the body; and providing the housing with a blind hole configured to engage with the protrusion of the sensor, the method further comprising the following steps:
- a) inserting the protrusion in the blind hole of the housing bringing into contact an end wall of the protrusion with a bottom wall of the blind hole;
- b) screwing up a bushing of an assembly device of the sensor to a first value of a tightening torque, the bushing having an external thread that engages with an internal thread of the blind hole of the housing and an internal thread that engages with the external thread of the protrusion of the sensor, wherein all the threads have the same pitch; and
- c) screwing a tightening means of the assembly device up to a second value of tightening torque, the tightening means having an internal thread that engages with the external thread of the protrusion of the sensor, the second value of tightening torque being generated by contact between an axial facing surface of the tightening means and an axially facing surface of the bushing.

2. The assembly method according to claim 1, wherein the threads have a pitch equal to 1.5 mm.

3. The assembly method according to claim 1, wherein during step c) the tightening means is a hexagonal nut.

4. The assembly method according to claim 1, wherein during step c) the tightening means is a hexagonal nut having an internal thread, the method further comprising a step of engaging the internal thread of the hexagonal nut with the external thread of the protrusion of the sensor.

5. The assembly method according to claim 1, wherein during step a) the bushing is not screwed to the internal thread of the housing.

6. The assembly method according to claim 1, wherein at the end of step b) the contact between the end wall of the protrusion and the bottom wall of the blind hole is secured by tightening the sensor by a hexagonal head of the body of the sensor means.

7. An assembly device for assembling a sensor on a housing, the assembly device comprising:
the sensor including a body having a protrusion, an external thread extending along a majority of a length of the protrusion, and an electrical cable connected to the body; and
the housing including a blind hole configured to engage with the protrusion of the sensor,
the protrusion being inserted in the blind hole of the housing bringing into contact an end wall of the protrusion with a bottom wall of the blind hole,
a first value of tightening torque being torqued up to a bushing of the assembly device of the sensor, the bushing having an external thread that engages with an internal thread of the blind hole of the housing and an internal thread that engages with the external thread of the protrusion of the sensor, wherein all the threads have the same pitch, and
a tightening means of the assembly device screwed up to a second value of tightening torque.

8. The assembly device according to claim 4, wherein the pitch of the threads is exactly equal to 1.5 mm.

9. The assembly device according to claim 7, wherein the tightening means is a hexagonal nut.

10. The assembly device according to claim 7, wherein the tightening means includes an internal thread, the internal thread engaging with the external thread of the protrusion of the sensor.

11. The assembly device according to claim 7, wherein the tightening means is a hexagonal nut, the hexagonal nut having an internal thread engaging with the external thread of the protrusion of the sensor.

12. The sensor according to claim 7, further comprising a temperature sensor for applications on rolling bearings of rail vehicles axles.

13. A sensor comprising:
a body, having a protrusion, an external thread extending along a majority of a length of the protrusion, and
a connecting electrical cable connected to the body on a housing;
the protrusion being inserted in the blind hole of the housing bringing into contact an end wall of the protrusion with a bottom wall of the blind hole;
a first value of tightening torque being torqued up to a bushing of an assembly device of the sensor, the bushing having an external thread that is adapted to engage with an internal thread of the blind hole of the housing and the internal thread that is engaged with an external thread of the protrusion of the sensor, wherein all the threads have the same pitch; and
the bushing of the assembly device tightened to a first torque value; and
a tightening means of the assembly device is screwed up to a second value of tightening torque the tghtening means having an internal thread that engage with the external thread of the protrusion of the sensor.

14. The sensor according to claim 13, further comprising a temperature sensor for applications on rolling bearings of rail vehicles axles.

15. The assembly method according to claim 13, wherein the threads have a pitch equal to 1.5 mm.

16. The assembly device according to claim 13, wherein the tightening means is a hexagonal nut.

17. The assembly device according to claim 13, wherein the tightening means is a hexagonal nut, the hexagonal nut includes an internal thread that engages with the external thread of the protrusion of the sensor.

* * * * *